(12) United States Patent
Joseph et al.

(10) Patent No.: US 10,007,747 B2
(45) Date of Patent: *Jun. 26, 2018

(54) CROSS-CURRENT POWER MODELLING USING LOGIC SIMULATION

(71) Applicant: International Business Machines Corporation, Armonk, NY (US)

(72) Inventors: Arun Joseph, Bangalore (IN); Arya Madhusoodanan, Bangalore (IN); Rahul M. Rao, Bangalore (IN); Suriya T. Skariah, Kochi (IN)

(73) Assignee: International Business Machines Corporation, Armonk, NY (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/676,206

(22) Filed: Aug. 14, 2017

(65) Prior Publication Data
US 2017/0337312 A1    Nov. 23, 2017

Related U.S. Application Data

(63) Continuation of application No. 15/244,345, filed on Aug. 23, 2016, which is a continuation of application No. 14/933,022, filed on Nov. 5, 2015, now Pat. No. 9,754,058.

(51) Int. Cl.
*G06F 17/50*    (2006.01)

(52) U.S. Cl.
CPC ...... *G06F 17/5036* (2013.01); *G06F 17/5022* (2013.01); *G06F 17/5009* (2013.01); *G06F 17/5045* (2013.01); *G06F 2217/78* (2013.01)

(58) Field of Classification Search
CPC ............. G06F 17/5009; G06F 17/5022; G06F 17/5036; G06F 17/5045; G06F 2217/78
USPC ........................................ 716/106, 109, 133
See application file for complete search history.

(56) References Cited

U.S. PATENT DOCUMENTS

| | | | |
|---|---|---|---|
| 5,625,803 A | 4/1997 | McNelly et al. |
| 5,838,947 A | 11/1998 | Sarin |
| 5,880,967 A | 3/1999 | Jyu et al. |
| 5,949,259 A | 9/1999 | Garcia |
| 6,064,230 A | 5/2000 | Singh |
| 6,728,941 B2 | 4/2004 | Chen |
| 7,127,384 B2 | 10/2006 | Zolotov et al. |
| 7,315,992 B2 | 1/2008 | Bhooshan et al. |

(Continued)

OTHER PUBLICATIONS

Dhanwada et al., "Efficient PVT Independent Abstraction of Large IP Blocks for Hierarchical Power Analysis," 2013 IEEE/ACM International Conference on Computer-Aided Design (ICCAD), 2013, pp. 458-465 DOI: 10.1109/ICCAD.2013.6691157.

(Continued)

*Primary Examiner* — Paul Dinh
(74) *Attorney, Agent, or Firm* — Robert J. Shatto

(57) ABSTRACT

A processor may receive a transistor level integrated circuit (IC) design to be modelled. The processor may determine that the transistor level IC design has a first stage and a second stage. The processor may determine a first cross-current effective capacitance of the first stage and a second cross-current effective capacitance of the second stage. The processor may then determine a cross-current effective capacitance for the transistor level IC design by accumulating the first and second cross-current effective capacitances.

1 Claim, 5 Drawing Sheets

(56) References Cited

U.S. PATENT DOCUMENTS

| | | |
|---|---|---|
| 7,882,464 B1 | 2/2011 | Rochel et al. |
| 8,359,558 B2 | 1/2013 | Tang et al. |
| 8,471,627 B2 | 6/2013 | Slavov |
| 8,601,420 B1 * | 12/2013 | Keller ................ G06F 17/5036 716/108 |
| 2014/0096099 A1 * | 4/2014 | Phillips ............... G06F 17/5036 716/113 |
| 2015/0123710 A1 | 5/2015 | Gupta et al. |
| 2017/0132342 A1 | 5/2017 | Joseph et al. |
| 2017/0132343 A1 | 5/2017 | Joseph et al. |

OTHER PUBLICATIONS

Accelerated Examination Support Document, U.S. Appl. No. 15/244,345, dated Aug. 17, 2016, 23 pgs.

Joseph et al., "Cross-Current Power Modelling Using Logic Simulation," U.S. Appl. No. 15/676,162, filed Aug. 14, 2017.

Accelerated Examination Support Document, U.S. Appl. No. 15/676,162, dated Aug. 7, 2017, 28 pgs.

List of IBM Patents or Patent Applications Treated as Related, Aug. 11, 2017, 2 pgs.

* cited by examiner

| VT-Type | Threshold Voltage | Base Config. | Distinctive Stage ID |
|---|---|---|---|
| VT-1 | $V_{TH1}$ | Stacked | US1 |
| | | Inverter | US2 |
| VT-2 | $V_{TH2}$ | Stacked | US3 |
| | | Inverter | US4 |
| VT-3 | $V_{TH3}$ | Stacked | US5 |
| | | Inverter | US6 |
| VT-4 | $V_{TH4}$ | Stacked | US7 |
| | | Inverter | US8 |

FIG. 2

CROSS-CURRENT POWER MODELLING USING LOGIC SIMULATION

BACKGROUND

The present disclosure relates generally to the field of computer hardware, and more particularly to modelling cross-current power consumption of multi-stage transistor level integrated circuit (IC) designs using logic simulation.

Power consumption of electrical components is often characterized as being either dynamic power consumption or static (also referred to as leakage) power consumption. One component of dynamic power consumption is cross-current power consumption, also referred to as crowbar or shoot-through power consumption, which occurs when there is a cross-current. Cross-current occurs when current flows directly from a positive power supply rail to a lower supply rail, such as a ground or negative power supply rail, without providing useful function, resulting in wasted power within the electrical component.

SUMMARY

Embodiments of the present invention disclose a method, computer program product, and system for modelling cross-current power consumption in multi-stage transistor level integrated circuit (IC) designs. A processor may receive a transistor level IC design to be modelled. The processor may determine that the transistor level IC design has a first stage and a second stage. The processor may determine a first cross-current effective capacitance of the first stage and a second cross-current effective capacitance of the second stage. The processor may then determine a cross-current effective capacitance for the transistor level IC design by accumulating the first and second cross-current effective capacitances.

The above summary is not intended to describe each illustrated embodiment or every implementation of the present disclosure.

BRIEF DESCRIPTION OF THE DRAWINGS

The drawings included in the present disclosure are incorporated into, and form part of, the specification. They illustrate embodiments of the present disclosure and, along with the description, serve to explain the principles of the disclosure. The drawings are only illustrative of typical embodiments and do not limit the disclosure.

FIG. 2 illustrates a set of distinctive stages for a transistor level design library, in accordance with embodiments of the present disclosure.

Figure 1:
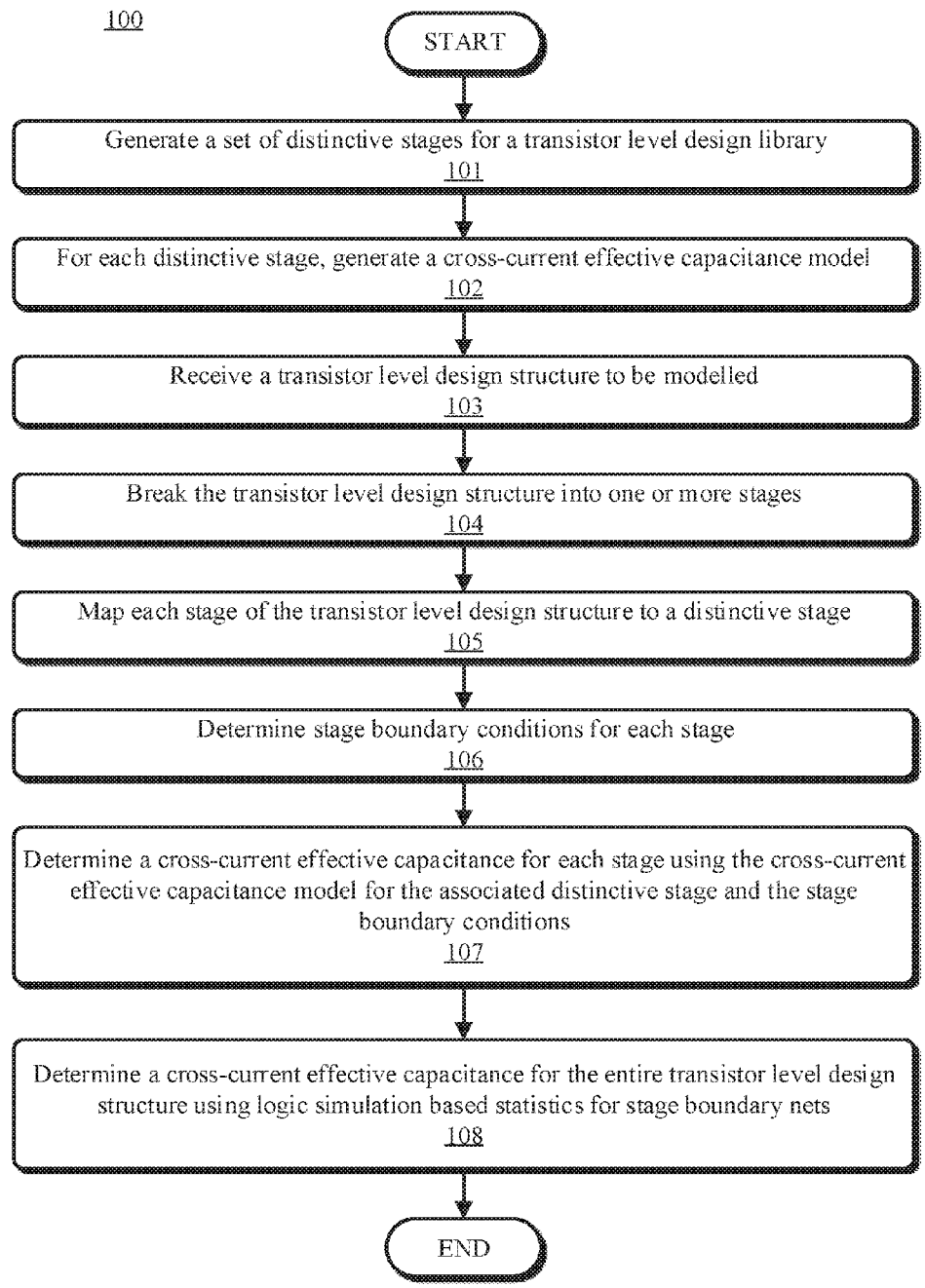
FIG. 1 illustrates a flowchart of an exemplary method for modelling cross-current power consumption in multi-stage transistor level integrated circuit (IC) designs, in accordance with embodiments of the present disclosure.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the invention.

DETAILED DESCRIPTION

Aspects of the present disclosure relate generally to the field of computer hardware, and in particular to modelling cross-current power consumption of multi-stage transistor level integrated circuit (IC) designs using logic simulation. While the present disclosure is not necessarily limited to such applications, various aspects of the disclosure may be appreciated through a discussion of various examples using this context.

Chip designers often use circuit modelling techniques to test and analyze their circuit designs prior to fabrication. This may be done to determine the expected power consumption of a chip in addition to ensuring that the design is operational. The chip designer can also compare variations in the design and their effect on the end product. For example, chip designers can test alternative IC designs to determine which design will be more power efficient.

Typically, the chip designer uses one of two techniques to model the power consumption of the circuit: circuit simulation or logic simulation. Circuit simulation, also known as electronic circuit simulation, uses mathematical models to replicate the behavior of electronic devices and/or circuits. Electronic circuit simulators are either analog simulators or mixed-mode simulators, which are capable of both analog and event-driven digital simulation.

Logic simulation models circuits (e.g., IC designs) as a collection of transistors which are connected using wires. This transistor level connectivity information includes a list of transistors and wires, and provides information similar to the schematic of the same IC design. In logic simulation, transistors are treated as binary switches and wires are modeled as connectors. The network of transistors and wires are used to create a binary decision diagram, which is then used to compute statistics such as the toggle count for each internal node, using a particular activity pattern. The activity pattern may be the input applied to a stage or cell during transistor level logic simulation. For example, an inverter may have an input A and an output Y. The activity pattern may define the pattern of inputs (e.g., 0 or 1) applied to the inverter input A. (e.g., 001101). The activity pattern may also define the rate at which the pattern transitions from one input to another (e.g., how long a first input value is applied before transitioning to the next input value).

The information derived from transistor level logic simulation is logged along with other information (such as device and wire capacitances, derived from offline circuit simulation) to enable logic simulation based power modelling. Logic simulation generally is less accurate than traditional circuit simulation techniques, but may be considerably faster. An IC design that may take several days or weeks to model using circuit simulation techniques may only take a few hours using logic simulation techniques. While most power components can be modelled using logic simulation, logic simulation alone is not able to model cross-current power consumption due to its dependence on the input slew.

As a chip designer designs a circuit to perform a task or operation, he may wish to test and/or analyze the circuit design to identify cross-current power consumption. Traditional circuit simulation techniques may be unacceptable due to their long turn-around-times. In order to quickly model the cross-current power consumption of the circuit, in some embodiments a computer system may model the circuit using a combination of traditional circuit simulation and logic simulation. The computer system may generate a set of distinctive stages for the transistor level design library that the chip designer is using. For each distinctive stage in the set of distinctive stages, the computer system may generate a cross-current effective capacitance model using traditional circuit simulation techniques.

The computer system may then receive, identify, or import the transistor level IC design (also referred to simply as the IC design) for the circuit to be modelled. The computer may break the IC design into one or more stages. Using characteristics of the one or more stages, the computer system may map each stage to one of the distinctive stages in the set of distinctive stages. The computer system may also determine boundary conditions for each stage. The computer system may use the boundary conditions and the cross-current effective capacitance model for the associated distinctive stage to determine a cross-current effective capacitance for each stage of the IC design. Finally, the computer system may determine the cross-current effective capacitance for the entire IC design by accumulating the cross-current effective capacitances of each stage. The computer system may use logic simulation to account for stage boundary nets (e.g., conductors that interconnect two or more component terminals in different stages).

In some embodiments, the computer system may generate a distinctive stage for each combination of base configuration and threshold voltage. Transistors in a stage may be in either a stacked base configuration or an inverter base configuration. These transistors in a stage may be considered to be in an inverter base configuration if all transistors in the stage are connected through their source or drain terminals to a power rail/pin (including ground or negative power supply voltage Vss pins). Otherwise, the transistors in the stage are in a stacked base configuration.

In some embodiments, the transistor level design library may contain transistors with different threshold voltages. For example, the transistor level design library may include transistors with a low threshold voltage, transistors with a medium threshold voltage, and transistors with a high threshold voltage. The transistors in the transistor level design library may be any type of transistor including, for example, bipolar-junction transistors (BJTs), field-effect transistors (FETs), and metal-oxide-semiconductor field-effect transistors (MOSFETs). The circuit designer can then choose which threshold voltage (or voltages, in multi-transistor designs) he wishes to use in his IC design.

Each distinctive stage may correspond to a specific combination of base configuration and threshold voltage. For example, a transistor level design library with a single threshold voltage may have two distinctive stages. A first distinctive stage for the stacked base configuration and a second distinctive stage for the inverter base configuration. Likewise, a transistor level design library with two threshold voltages may have four distinctive stages. Accordingly, the number of distinctive stages in a design library may be twice the number of threshold voltages that transistors in the design library have.

In some embodiments, the computer system may break the IC design into individual stages by identifying boundary nets that exist between, and separate, individual stages. The computer system may identify that a net is a boundary net if the net is driven by a drain of one or more FETs and simultaneously drives either one or more FETs' gates or the primary output(s) (PO) of a cell (or a stage). Additionally, nets that are driven by the drain of one or more FETs may be boundary nets if the FETs' gates are driven by the primary input(s) (PI) of the same cell (or stage). The groups of transistors between boundary nets may be considered individual stages.

Referring now to FIG. 1, shown is a flowchart of an exemplary method 100 for modelling cross-current power consumption in multi-stage IC designs, in accordance with embodiments of the present disclosure. One or more operations of the method 100 may be performed by a computer system. In some embodiments, one or more operations of the method 100 may be performed by a user. The method 100 may begin at operation 101, wherein the computer system may generate a set of distinctive stages for a transistor level design library.

The transistor level design library may include cells with transistors in one of two base configurations: a stacked base configuration and an inverter base configuration. If the source or terminals of all transistors in a cell are connected to a power rail or pin, the transistors are in the inverter base configuration. Otherwise, the transistors are in the stacked base configuration. In some embodiments, the cells may be multi-stage cells that include transistors in both a stacked base configuration (e.g., in a first stage of the multi-stage cell) and an inverter base configuration (e.g., in a second stage of the multi-stage cell). For example, a CMOS AND gate (such as the one shown in FIG. 3) contains transistors in an inverter base configuration and transistors in a stacked base configuration.

Transistors in the transistor level design library may also be organized into different threshold voltage (VT)-Types depending on their threshold voltages. For example, transistors with a first threshold voltage may be considered to be first VT-Type transistors, while transistors with a second threshold voltage may be considered to be second VT-Type transistors. A transistor level design library may include one or more of different VT-Types.

Each distinctive stage may correspond to a given transistor base configuration (e.g., stacked and/or inverted) and VT-Type. Accordingly, the number of distinctive stages in a transistor level design library may be twice the number of different threshold voltages used by transistors in the transistor level design library. For example, a transistor level design library that includes three VT-Types may have six distinctive stages. A visual representation of the distinctive stages present in a transistor level design library with four VT-Types is shown in FIG. 2.

After generating a set of distinctive stages for the transistor level design library at operation 101, a cross-current effective capacitance model may be generated for each distinctive stage at operation 102. The cross-current effective capacitance model may be generated using electronic circuit simulation techniques. In some embodiments, the electronic circuit simulation may involve using analog simulators. In other embodiments, mixed-mode simulators that include both analog and event-driven digital simulation may be used to generate the cross-current effective capacitance model.

Dynamic power consumption is often the dominant source of power consumption in CMOS circuits because most of the power used by the circuit may be consumed in moving charges in the parasitic capacitor in the CMOS transistor gates. One model of a circuit consisting of several transistors involves the circuit being approximated as one capacitor, having an effective capacitance, that is charged and discharged between the power-supply rails. Accordingly, the effective capacitance of the circuit is often used to approximate the dynamic power consumption of the circuit in circuit modeling or simulation. The effective capacitance of the circuit will generally encapsulate the effects of many physical capacitances (such as parasitic capacitances and gate capacitances) and power dissipation due to short circuit currents.

The effects of individual dynamic power components, such as cross-current power consumption, can be separately viewed as having their own effective capacitances. For example, a cross-current effective capacitance may be determined for the circuit. The cross-current effective capacitance may be the approximated effective capacitance of the circuit due to the cross-current power consumption.

The cross-current power consumption of a design is dependent on numerous factors. Some of the factors are based on inherent or physical characteristics of the transistors, such as the threshold voltage, process (e.g., fast process vs. slow process), and temperature. Other factors are the boundary factors (also referred to herein as the boundary conditions). The boundary conditions include the slew or slew rate, the load (as seen at the output of the stage), and the supply voltage. Using circuit simulation techniques, a cross-current effective capacitance model may be generated for each stage that takes into consideration one or more of the factors that affect the cross-current power consumption of a design.

Generally, the cross-current effective capacitance model will not include the threshold voltage as a variable because the model is being generated for each distinctive stage, and the distinctive stages are already separated based, at least in part, on the threshold voltage of the transistors. However, in some embodiments, the cross-current effective capacitance model may include the threshold voltage of the transistors as a variable.

In some embodiments, the cross-current effective capacitance model may not include each factor as a variable. For example, the model may only include the boundary conditions as variables. This may be particularly advantageous when the boundary conditions have a significantly stronger influence on the cross-current power loss than other factors. For example, while the cross-current power loss of a design is dependent on temperature, if the design is intended to be used in conditions where there is little variance in the temperature of the transistors, the increased accuracy of the model from including the temperature may not be worth the increased time required to generate the model. As such, the cross-current effective capacitance model may calculate an effective capacitance for a distinctive stage using only the boundary conditions.

In some embodiments, the cross-current effective capacitance model for a distinctive stage may be generated by simulating the cross-current power consumption of the distinctive stage using traditional circuit simulation techniques. The simulation may involve sweeping across a range of values for the various factors of cross-current power consumption. For example, a user may want to generate a cross-current effective capacitance model parameterized by the slew rate and positive supply voltage Vdd. The simulation may determine the cross-current power consumption of the distinctive stage with different combinations of slew rate and positive supply voltage Vdd. The slew rate and positive supply voltage Vdd may be simulated within operating ranges consistent with their intended use. The cross-current effective capacitance model may then be generated from the computed cross-current power consumption using the following equation:

$$Ceff = \frac{P(\text{slew}, Vdd)}{Vdd^2 * f}$$

where P(slew, Vdd) is the cross-current power consumption as a function of the slew and the positive supply voltage Vdd (as determined by the circuit simulation), and f is the input signal frequency.

In some embodiments, the cross-current power consumption function may be found using linear regression (or polynomial regression) on the data collected from the circuit simulation to find a model that best fits the collected data. For example, the computer system may generate a number of data points that correlate cross-current power consumption with slew and positive supply voltage Vdd using the circuit simulation techniques. The computer system may then use a multiple linear regression technique to find the linear function P(slew, Vdd) that best fits the collected data. Using the above equation, the computer system may determine the cross-current effective capacitance model as a function of slew and positive supply voltage Vdd.

After the cross-current effective capacitance models are generated at operation 102, the computer system may receive an IC design to be modelled at operation 103. The IC design may be encoded as a design structure on machine-readable transmission or storage media (e.g., non-transitory storage media) to include data and/or instructions that, when executed or otherwise processed on a data processing system (such as a computer system performing the method 100), generate a logically, structurally, mechanically, or otherwise functionally equivalent representation of hardware components, circuits, devices, or systems. The IC design may include data structures having hardware-description language (HDL) design entities or other data structures conforming to, and/or compatible with, lower-level HDL design languages such as Verilog and VHDL, and/or higher level design languages such as C or C++. The design structure may be generated, e.g., using electronic computer-aided design (ECAD) software.

In some embodiments, the IC design may be in the form of a netlist. A netlist is a description of the connectivity of electrical components in a circuit. In its simplest form, a netlist contains a list of the terminals of all electronic components in a circuit and a list of the nets (e.g., electrical conductors) that interconnect the terminals. For example, a netlist may comprise compiled or otherwise processed data structures representing a list of wires, discrete components, logic gates, control circuits, I/O devices, models, etc. that describes the connections to other elements and circuits in an integrated circuit design (e.g., a design structure). The netlist may be synthesized using an iterative process in which the netlist is resynthesized one or more times depending on design specifications and parameters for the device. As with other design structures, the netlist may be recorded on a machine-readable data storage medium. The medium may be a non-volatile storage medium such as a magnetic or optical disk drive, a compact flash, or other flash memory. Additionally, or in the alternative, the medium may be a system or cache memory, buffer space, or electrically or optically conductive devices and materials on which data packets may be transmitted and intermediately stored via the Internet, or other networking suitable means.

Figure 3:
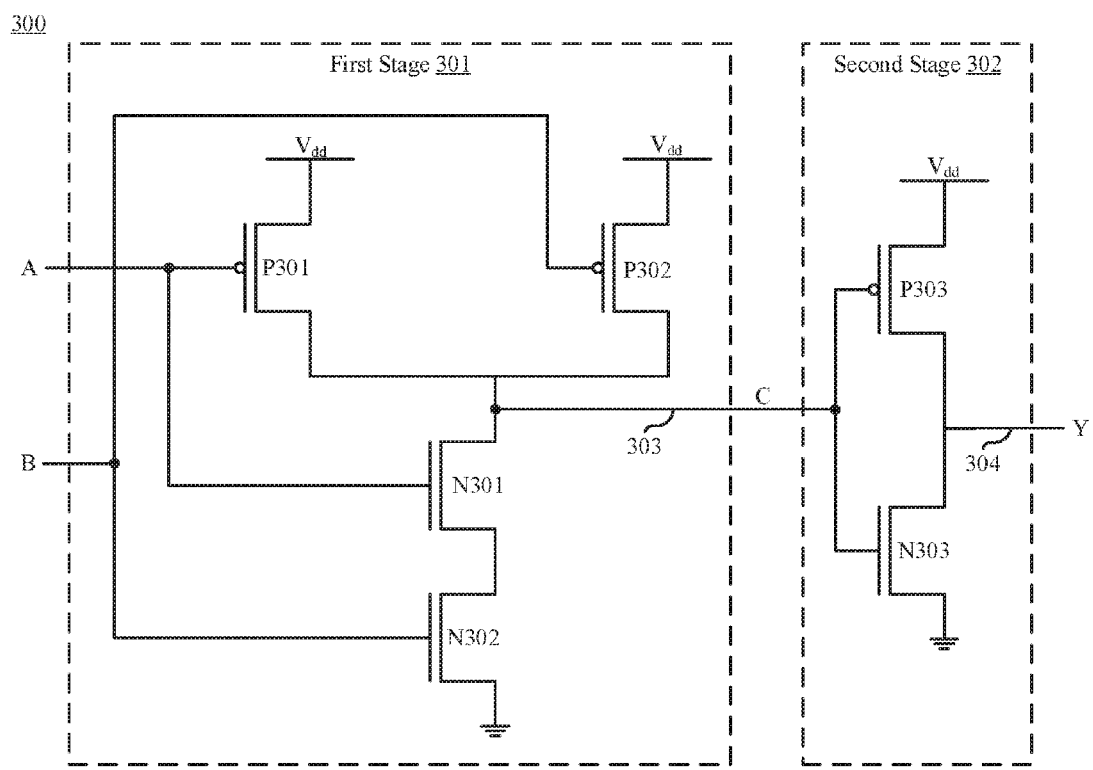
FIG. 3 illustrates an exemplary two-stage transistor level IC design that may be modelled, in accordance with embodiments of the present disclosure.

After receiving the IC design at operation 103, the computer system may break the IC design into one or more stages at operation 104. A transistor level design library may include one or more transistor configurations (also referred to herein as cells). The cells may include one or more transistors arranged to perform a specific function. For example, an inverter cell may be a CMOS inverter that includes two transistors arranged as shown in FIG. 3. Other cells may be considerably more complicated. For example, a cell may include one or more inverters (such as the cell shown in FIG. 4), logic gates (such as the CMOS AND gate shown in FIG. 3), amplifiers, flip flops, or other circuitry in any number of different configurations.

The IC design may be broken down into a set of one or more inverter stages and/or one or more stacked stages. For example, a CMOS AND gate (such as the one shown in FIG. 3) consists of a stacked stage and an inverter stage. The individual stages may be separated by a net (also referred to herein as a boundary net). For example, a CMOS AND gate (such as the one shown in FIG. 3) may be broken down into a stacked stage (the CMOS NAND stage) and an inverter stage. The computer system may break the IC design into stages by identifying groups of transistors that, e.g., share an input and/or have a common output. These groups of transistors may be considered to be part of a common stage. The computer system may also recognize common structures, such as inverters or NAND gates, as individual stages.

In some embodiments, the computer system may break the IC design into stages by identifying the boundary nets present in the IC design. Boundary nets are the nets that exist at, or define, the boundaries of a stage. The boundary nets of a cell may be the nets (e.g., conductors that interconnect two or more component terminals) that are driven by a drain of one or more FETs and simultaneously drives one or more FET gates or the cell's PO. Additionally, nets that are driven by the drain of one or more FETs may be boundary nets if the FETs' gates are driven by the same cell PI.

After breaking the IC design into one or more stages at operation 104, the computer system may map each stage to a distinctive stage at operation 105. The computer system may map the stages to a distinctive stage by identifying the characteristics of the stage. The characteristics of the stage may include the transistor base configuration of the stage (e.g., stacked or inverter) as well as the VT-Type of the transistors. The computer system may then compare the transistor base configuration and VT-Type of each stage to the set of distinctive stages generated at operation 101. Based on the comparison, the computer system may determine an associated distinctive stage for each stage in the IC design.

In order to identify the base configuration of a stage, the computer system may first identify all of the transistors in the stage. The computer system may then determine which transistors to ignore. For example, transistors that are connected to a boundary net by their drains may be ignored if they are also connected to a second boundary net through their sources. The computer system may then determine, based on the remaining (e.g., not ignored) transistors, whether the stage is a stacked stage or an inverter stage. If the source or drain terminals of all remaining transistors in the stage are connected to a power rail or pin, the transistors are in the inverter base configuration. Otherwise, the transistors are in the stacked base configuration.

In some embodiments, a given stage in the IC design may have more than one VT-Type. For example, some of the transistors in the stage may have a first threshold voltage (and, accordingly, a first VT-Type), while other transistors in the stage may have a second threshold voltage (and second VT-Type). In these embodiments, the computer system may determine the dominant VT-Type for the stage. The computer system may then map the stage to a distinctive stage corresponding to the dominant VT-Type. For example, if the stage is a stacked stage, the computer system may map the stage to the distinctive stage that corresponds to a stacked stage with the dominant VT-Type.

In some embodiments, the dominant VT-Type may be the VT-Type with the lowest threshold voltage. In other embodiments, the dominant VT-Type may be the VT-Type corresponding to the most transistors in the stage. For example, if a stage has 100 transistors, 95 of which are a first VT-Type and 5 of which are a second VT-Type, the first VT-Type may be considered the dominant VT-Type.

In some embodiments, the computer system may ignore certain transistors when determining the dominant VT-Type. For example, transistors that are connected to a boundary net by their drains may be ignored if they are also connected to a second boundary net through their sources. The computer system may then determine the dominant VT-Type of the remaining (e.g., not ignored) transistors.

After mapping each stage to a distinctive stage at operation 105, the computer system may determine stage boundary conditions for each stage at operation 106. The stage boundary conditions for a stage may include the slew, load, and supply voltage of the stage. In some embodiments, the supply voltage may be determined using a netlist to identify the voltages of the nets attached to the sources of the transistors.

The value of the positive supply voltage can be asserted during power analysis time, depending on the voltage corner of interest for the power analysis. The load at the output of each stage can be computed by taking into account the different physical capacitances that the stage is driving. This may include the wire capacitance of the stage boundary net and the different capacitances in the next stage in the IC design (e.g., the capacitances of the electrical components in the next stage). The input slew for first stage is the slew at the primary input pin(s) of the IC design. The input slew for the remaining stages may be computed empirically from the input slew of the previous stage using other parameters including, but not limited to, the drive strength of the transistors in the previous stage and the load driven by the previous stage.

After determining stage boundary conditions for each stage at operation 106, the computer system may determine a cross-current effective capacitance for each stage using the cross-current effective capacitance model for the associated distinctive stage and the stage boundary conditions at operation 107. The cross-current effective capacitance model may be a multi-variable model that calculates a cross-current effective capacitance as a function of (e.g., is parameterized by) the stage boundary conditions.

In some embodiments, the computer system may also use inherent or physical characteristics of the transistors to determine the cross-current effective capacitance for a stage. For example, the cross-current effective capacitance model may include, as a variable, the temperature of the transistors.

After determining a cross-current effective capacitance for each stage at operation 107, the computer system may determine a cross-current effective capacitance for the entire IC design at operation 108. The computer system may accumulate the cross-current effective capacitance of each stage. For example, the IC design may include two stages. The first stage may have a first capacitance C1 (i.e., a first determined cross-current effective capacitance) and the second stage may have a second capacitance C2 (i.e., a second determined cross-current effective capacitance). As with accumulating power consumption by individual components, effective switching capacitances may be accumulated as the sum of the individual capacitances. Therefore the accumulated cross-current effective capacitance C3 of the two stages may be determined using the equation:

$$C3=C1+C2$$

More complicated IC designs may include additional stages. A person of ordinary skill in the art would recognize how to accumulate the determined cross-current effective capacitances of more complicated IC designs having additional stages.

In some embodiments, logic simulation may be used to account for the effects of stage boundary nets when accumulating the cross-current effective capacitances of the stages. The computer system may determine logic simulation based statistics for each boundary net. For example, the computer system may determine the toggle count of the boundary nets using logic simulation. The toggle counts of a boundary net may correspond to the number of times the signal at the boundary net is switched during a clock cycle. The toggle count may be based on the net switching frequency of the boundary net. The cross-current effective capacitance of each stage may be weighted based on the toggle count of the boundary nets. The weighted cross-current effective capacitances may then be accumulated as discussed herein to determine the cross-current effective capacitance of the IC design.

Referring now to FIG. 2, shown is a set of distinctive stages for a transistor level design library, in accordance with embodiments of the present disclosure. The transistor level design library of FIG. 2 includes four different VT-Types VT1-VT4 (e.g., transistors with four different threshold voltages). In other words, the transistor level design library includes one or more transistors with a first threshold voltage $V_{TH1}$, one or more transistors with a second threshold voltage $V_{TH2}$, one or more transistors with a third threshold voltage $V_{TH3}$, and one or more transistors with a fourth threshold voltage $V_{TH4}$.

For each VT-Type, the transistors may be in either a stacked base configuration or an inverter base configuration as discussed herein. Accordingly, there are eight distinctive stages US1-US8. For example, the first distinctive stage US1 may correspond to a stacked based configuration of VT-1 transistors. Likewise, the second distinctive stage US2 may correspond to an inverter base configuration of VT-1 transistors, and so on.

Referring now to FIG. 3, shown is an exemplary two-stage IC design 300 that may be modelled, in accordance with embodiments of the present disclosure. The IC design 300 may be a CMOS AND gate having a first stage 301 and a second stage 302. The first stage 301 may be in a stacked base configuration, while the second stage 302 may be in an inverter base configuration. The IC design 300 of the CMOS AND gate may correspond to a cell in a transistor level design library. The first stage 301 is a CMOS NAND gate and the second stage 302 is a CMOS inverter. The first stage 301 and second stage 302 are connected by a net 303 (e.g., a conductive wire or track). The net 303 is a boundary net because it connects two stages together.

The first stage 301 may include two pFETs P301 and P302, as well as two nFETs N301 and N302. The pFETs P301 and P302 may be connected by their sources to a positive supply voltage $V_{dd}$, and by their gates to inputs A and B, respectively. The drains of the pFETs P301 and P302 may be connected to each other, to the drain of the first nFET N301, and to the net 303. The source of the first nFET N301 may be connected to the drain of the second nFET N302, and the gate of the first nFET N301 may be connected to the first input A. The gate of the second nFET N302 may be connected to the second input B, and the source of the second nFET N302 may be connected to ground (or, alternatively, to a negative supply voltage Vss). The drains of the first and second pFETs P301, P302 and the first nFET N301 may connect the first stage 301 to the second stage 302 via the net 303. Inputs A and B may be primary inputs for the CMOS AND gate, as well as for the first stage 301.

The second stage 302 may include a third pFET P303 and a third nFET N303. The source of the third pFET P303 may be connected to the positive supply voltage $V_{dd}$. The gate of the third pFET P303 may be connected to the output C of the NAND gate (first stage 301), which also acts as an input for the second stage 302. The drain of the third pFET P303 may be connected to the output Y of the AND gate and to the drain of the third nFET N303. The gate of the third nFET N303 may be connected to the output C of the NAND gate (first stage 301), and the source of the third nFET N303 may be connected to ground (or, alternatively, to a negative supply voltage Vss). Output Y may be a primary output for the CMOS AND gate and for the second stage 302.

There are several ways that the computer system may identify that the IC design 300 of the CMOS AND gate has two stages. First, the computer system may be programmed to recognize certain IC designs, such as common IC designs, and identify the stages within them. Because a CMOS AND gate is a relatively common component, the computer system may be programmed to recognize the IC design 300 of the CMOS AND gate as being a two-stage design.

Alternatively, the computer system may recognize the two stages of the IC design 300 by identifying that net 303 is a boundary net that separates two groups of transistors (e.g., stages). The net 303 is connected to, and driven by, the drains of the first pFET P301, the second pFET P302, and the first nFET N301. Additionally, the other end of the net 303 is connected to, and drives, the gates of the third pFET P303 and the third nFET N303. As discussed in reference to FIG. 1, the computer system may identify the net 303 as a boundary net because it is driven by the drains of one or more FETs (pFETs P301 and P302 and nFET N301) and also drives the gates of one or more other FETs (pFET P303 and nFET N303). Likewise, net 304, which carries the output signal Y, is a boundary net because it is driven by the drains of FETs whose sources are driven by a primary input. Specifically, both the third pFET P303 and the third nFET N303 are driven by a primary input (namely, signal C), and their drains drive the net 304. Because boundary nets separate individual stages, the computer system may recognize that the IC design 300 has two stages (namely, the first stage 301 and the second stage 302).

After breaking the IC design 300 down into its two stages, the computer system may determine what type of base configuration each stage is in. The computer system may first identify which, if any, of the transistors should be ignored. The computer system may ignore any transistor that connects to a boundary net through its drain if the transistor also connects to another boundary net through its source. Because none of the transistors in the IC design 300 meet this criterion, the computer system may not ignore any of the transistors.

Next, the computer system may determine which stage is an inverter stage. A stage is in an inverter base configuration if the source or drain terminals of all transistors in the stage are connected to a power rail/pin (including ground and negative supply voltage Vss). If a stage does not meet this criterion, it is a stacked stage. The computer system may determine that the first stage 301 is a stacked stage because not every transistor is connected through its source or drain terminal to a power rail/pin. For example, the source terminal of the first nFET N301 is connected to the drain terminal of the second nFET N302. Likewise, the drain terminal of the first nFET N301 is connected to the drain terminals of the first and second pFETs P301 and P302. Because neither the source terminal nor the drain terminal of the first nFET N301 is connected to a power rail, the first stage 301 is a stacked stage.

Turning to the second stage 302, the computer system may determine that the second stage is an inverter stage. Both the third pFET P303 and the third nFET N303 are connected through their source or drain terminals to a power rail/pin. Specifically, the third pFET P303 is connected through its source to the positive supply power Vdd while the third nFET N303 is connected through its drain to the ground. Because the second stage 302 satisfies the inverter criterion, the computer system may determine that the second stage is in the inverter base configuration.

After determining the base configuration for each stage, the computer system may determine the VT-Type for the two stages. The transistors in the first stage 301 may have a first threshold voltage $V_{TH1}$, while the transistors in the second stage may have a second threshold voltage $V_{TH2}$. The computer system may then use the set of distinctive stages (e.g., as shown in FIG. 2) to determine that the first stage 301 should be mapped to the first distinctive stage US1 and the second stage 302 should be mapped to the fourth distinctive stage US4.

The computer system may then determine the stage boundary conditions for the first stage 301 and the second stage 302. The stage boundary conditions may include the slew of the input signals (e.g., signals A and B for the first stage 301 and signal C for the second stage 302), the positive supply voltage Vdd, and the load on the circuit (e.g., the load of any circuitry connected to the net 304 carrying signal Y).

After determining the stage boundary conditions for the first stage 301 and the second stage 302, the computer system may use the stage boundary conditions and the cross-current effective capacitance models for the associated distinctive stages to determine the cross-current effective capacitance of each stage. For example, the computer system may use the stage boundary conditions for the first stage 301 and the cross-current effective capacitance model for the first distinctive stage US1 to determine the cross-current effective capacitance of the first stage 301. Likewise, the computer system may use the stage boundary conditions for the second stage 302 and the cross-current effective capacitance model for the fourth distinctive stage US4 to determine the cross-current effective capacitance of the second stage 302.

After determining the cross-current effective capacitances of the first stage 301 and the second stage 302, the computer system may accumulate the capacitances of the stages to determine the cross-current effective capacitance of the IC design 300. Logic simulation may be used to weight the cross-current effective capacitances of the first and second stages 301, 302 to account for the effects of the boundary net 303. The weighting of cross-current effective capacitances for individual stages is discussed more thoroughly in reference to FIG. 4.

Figure 4:
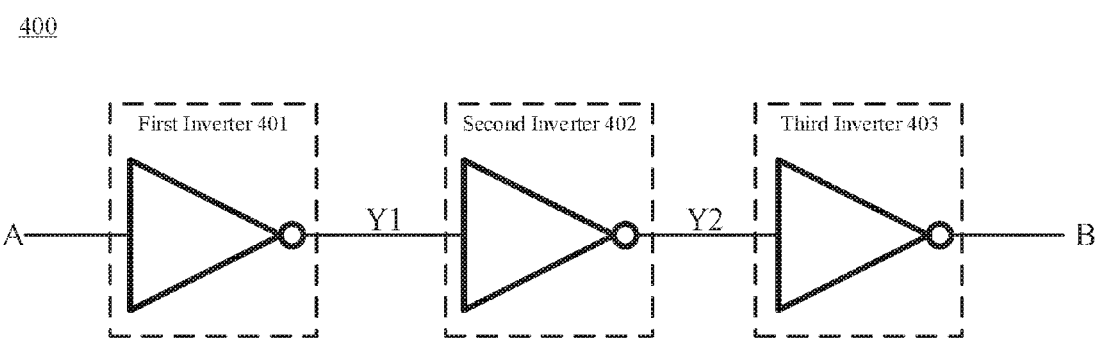
FIG. 4 illustrates an exemplary three-stage IC design with boundary nets that may be modelled, in accordance with embodiments of the present disclosure.

Referring now to FIG. 4, shown is an exemplary IC design of a cell 400 that may be modelled, in accordance with embodiments of the present disclosure. The cell 400 may include three inverters 401, 402, and 403. An input signal A may be connected to the input terminal of the first inverter 401 and an output signal B may exit the output terminal of the third inverter 403. Each inverter 401-403 may be a single stage inverter such that the cell 400 may be a three-stage IC design. In some embodiments, the cell 400 may be made up of multi-stage components. For example, the cell 400 may have one or more CMOS AND gates (such as the one discussed in reference to FIG. 3) that have both a stacked stage and an inverter stage.

The inverters 401-403 are connected together by boundary nets Y1 and Y2. The boundary nets Y1 and Y2 may be conductors that connect the terminals of the inverters 401-403. For example, the output terminal of the first inverter 401 may be connected to the input terminal of the second inverter 402 by a first boundary net Y1. Likewise, the output of the second inverter 402 may be connected to the input terminal of the third inverter 403 by a second boundary net Y2. In some embodiments, such as those where the cell 400 is connected to one or more additional cells, boundary nets may also exist at either or both ends of the cell. For example, the cell 400 may be connected to cells on both sides such that a boundary net exists between a second cell and the input terminal of the first inverter 401 (e.g., the net that carries input signal A may be a boundary net), as well as between the output terminal of the third inverter 403 and a third cell (e.g., the net that carries output signal B may be a boundary net).

A computer system may determine the cross-current effective capacitances of each inverter 401-403, as discussed herein. For example, the computer system may determine, by mapping the inverters to distinctive stages and using cross-current effective capacitance models, the cross-current effective capacitances of the three inverter stages 401, 402, and 403.

Using transistor level logic simulation, the toggle count of the boundary nets Y1 and Y2 may be computed. The computer system may determine that the cross-current effective capacitance of the first inverter stage 401 should be weighted by W1 in relation to the last (or third) inverter stage 403 and that the cross-current effective capacitance of the second inverter stage 402 should be weighted by W2, in relation to the last inverter stage 403. Accordingly, the computer system may accumulate the cross-current effective capacitances for the three inverters 401-403 using the weighted equation:

$$C4=W1*C1+W2*C2+C3$$

where C4 is the cross-current effective capacitance of the cell 400, C1 is the cross-current effective capacitance of the first inverter stage 401, C2 is the cross-current effective capacitance of the second inverter stage 402, and C3 is the cross-current effective capacitance of the third inverter stage 403. In the example circuit topology shown in FIG. 4, no weighting is required because the toggle counts of the first and second boundary nets Y1 and Y2 are the same (e.g., both weights W1 and W2 are equal to 1).

Figure 5:
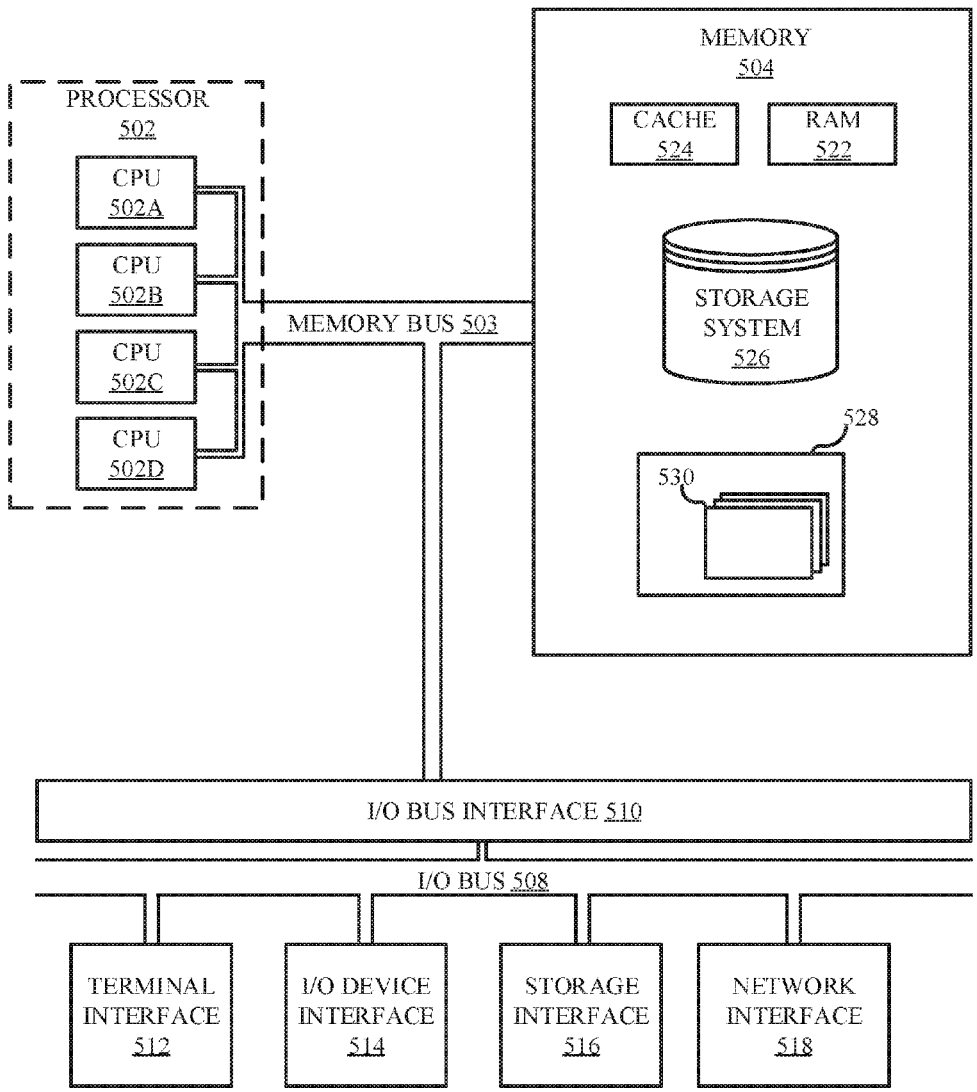
FIG. 5 illustrates a high-level block diagram of an example computer system that may be used in implementing one or more of the methods, tools, and modules, and any related functions, described herein, in accordance with embodiments of the present disclosure.

Referring now to FIG. 5, shown is a high-level block diagram of an example computer system 501 that may be used in implementing one or more of the methods, tools, and modules, and any related functions, described herein (e.g., using one or more processor circuits or computer processors of the computer), in accordance with embodiments of the present disclosure. In some embodiments, the major components of the computer system 501 may comprise one or more CPUs 502, a memory subsystem 504, a terminal interface 512, a storage interface 516, an I/O (Input/Output) device interface 514, and a network interface 518, all of which may be communicatively coupled, directly or indirectly, for inter-component communication via a memory bus 503, an I/O bus 508, and an I/O bus interface unit 510.

The computer system 501 may contain one or more general-purpose programmable central processing units (CPUs) 502A, 502B, 502C, and 502D, herein generically referred to as the CPU 502. In some embodiments, the computer system 501 may contain multiple processors typical of a relatively large system; however, in other embodiments the computer system 501 may alternatively be a single CPU system. Each CPU 502 may execute instructions stored in the memory subsystem 504 and may include one or more levels of on-board cache.

System memory 504 may include computer system readable media in the form of volatile memory, such as random access memory (RAM) 522 or cache memory 524. Computer system 501 may further include other removable/non-removable, volatile/non-volatile computer system storage media. By way of example only, storage system 526 can be provided for reading from and writing to a non-removable, non-volatile magnetic media, such as a "hard drive." Although not shown, a magnetic disk drive for reading from and writing to a removable, non-volatile magnetic disk (e.g., a "floppy disk"), or an optical disk drive for reading from or writing to a removable, non-volatile optical disc such as a CD-ROM, DVD-ROM or other optical media can be provided. In addition, memory 504 can include flash memory, e.g., a flash memory stick drive or a flash drive. Memory devices can be connected to memory bus 503 by one or more data media interfaces. The memory 504 may include at least one program product having a set (e.g., at least one) of program modules that are configured to carry out the functions of various embodiments.

One or more programs/utilities 528, each having at least one set of program modules 530 may be stored in memory 504. The programs/utilities 528 may include a hypervisor (also referred to as a virtual machine monitor), one or more operating systems, one or more application programs, other program modules, and program data. Each of the operating systems, one or more application programs, other program modules, and program data or some combination thereof, may include an implementation of a networking environment. Program modules 530 generally perform the functions or methodologies of various embodiments.

For example, in an embodiments of the present disclosure, the program modules 530 may include a library simulation module, a design decomposition module, and an effective capacitance calculator. The library simulation module may include instructions to generate a set of distinctive stages for a transistor level design library (e.g., perform operation 101 of method 100 discussed in reference to FIG. 1). The library simulation module may include further instructions to generate a cross-current effective capacitance model for each distinctive stage using electronic circuit simulation techniques (e.g., perform operation 102 of method 100).

The design decomposition module may include instructions to receive an IC design that is going to be modelled (e.g., perform operation 103 of method 100). The design decomposition module may include further instructions to break the IC design into one or more individual stage (e.g., perform operation 104 of method 100). The design decomposition module may also contain instructions to map each stage of the IC design to one of the distinctive stages generated by the library simulation module (e.g., perform operation 105 of method 100).

The effective capacitance calculator may include instructions to determine stage boundary conditions for each stage identified by the design decomposition module (e.g., perform operation 106 of method 100). The effective capacitance calculator may include further instructions to determine a cross-current effective capacitance for each stage using the stage boundary conditions and the cross-current effective capacitance models generated by the library simulation module (e.g., perform operation 107 of method 100). The effective capacitance calculator may also include instructions to determine a cross-current effective capacitance of the entire IC design by accumulating the capacitances of the individual stages and using logic simulation to account for boundary nets (e.g., perform operation 108 of method 100).

Although the memory bus 503 is shown in FIG. 5 as a single bus structure providing a direct communication path among the CPUs 502, the memory subsystem 504, and the I/O bus interface 510, the memory bus 503 may, in some embodiments, include multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 510 and the I/O bus 508 are shown as single respective units, the computer system 501 may, in some embodiments, contain multiple I/O bus interface units 510, multiple I/O buses 508, or both. Further, while multiple I/O interface units are shown, which separate the I/O bus 508 from various communications paths running to the various I/O devices, in other embodiments some or all of the I/O devices may be connected directly to one or more system I/O buses.

In some embodiments, the computer system 501 may be a multi-user mainframe computer system, a single-user system, or a server computer or similar device that has little or no direct user interface, but receives requests from other computer systems (clients). Further, in some embodiments, the computer system 501 may be implemented as a desktop computer, portable computer, laptop or notebook computer, tablet computer, pocket computer, telephone, smart phone, network switches or routers, or any other appropriate type of electronic device.

It is noted that FIG. 5 is intended to depict the representative major components of an exemplary computer system 501. In some embodiments, however, individual components may have greater or lesser complexity than as represented in FIG. 5, components other than or in addition to those shown in FIG. 5 may be present, and the number, type, and configuration of such components may vary.

As discussed in more detail herein, it is contemplated that some or all of the operations of some of the embodiments of methods described herein may be performed in alternative orders or may not be performed at all; furthermore, multiple operations may occur at the same time or as an internal part of a larger process.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. In the previous detailed description of exemplary embodiments of the various embodiments, reference was made to the accompanying drawings (where like numbers represent like elements), which form a part hereof, and in which is shown by way of illustration specific exemplary embodiments in which the various embodiments may be practiced. These embodiments were described in sufficient detail to enable those skilled in the art to practice the embodiments, but other embodiments may be used and logical, mechanical, electrical, and other changes may be made without departing from the scope of the various embodiments. In the previous description, numerous specific details were set forth to provide a thorough understanding the various embodiments. But, the various embodiments may be practiced without these specific details. In other instances, well-known circuits, structures, and techniques have not been shown in detail in order not to obscure embodiments.

Different instances of the word "embodiment" as used within this specification do not necessarily refer to the same embodiment, but they may. Any data and data structures illustrated or described herein are examples only, and in other embodiments, different amounts of data, types of data, fields, numbers and types of fields, field names, numbers and types of rows, records, entries, or organizations of data may be used. In addition, any data may be combined with logic, so that a separate data structure may not be necessary. The previous detailed description is, therefore, not to be taken in a limiting sense.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present invention has been described in terms of specific embodiments, it is anticipated that alterations and modification thereof will become apparent to the skilled in the art. Therefore, it is intended that the following claims be interpreted as covering all such alterations and modifications as fall within the true spirit and scope of the invention.

What is claimed is:

1. A system for modeling cross-current power consumption in multi-stage transistor level integrated circuit (IC) designs, the system comprising:
   a memory;
   a processor in communication with the memory, the processor being configured to perform a method comprising:
   identifying two VT-Types in a transistor level design library, each VT-Type corresponding to transistors with a different threshold voltage, the VT-Types including a first VT-Type and a second VT-Type, the first VT-Type corresponding to transistors with a first threshold voltage, the second VT-Type corresponding to transistors with a second threshold voltage;
   determining that the transistor level design library includes at least one cell in a stacked base configuration and at least one cell in an inverter base configuration, wherein a cell is in an inverter base configuration when all transistors in the cell are connected to a power supply through their source or drain terminals, wherein the at least one cell in the stacked base configuration comprises at least two transistors of the same type, wherein one transistor of the at least two transistors is stacked on another transistor of the at least two transistors;
   generating a set of distinctive stages for the transistor level design library, each distinctive stage corresponding to a different combination of VT-Type and base configuration, the set of distinctive stages including a first distinctive stage and a second distinctive stage;
   generating, using circuit simulation and for each distinctive stage in the set of distinctive stages, a cross-current effective capacitance model parameterized by stage boundary conditions and physical conditions, wherein cross-current is crowbar current, the stage boundary conditions including a slew, a load, and a supply voltage, the physical conditions including a threshold voltage of transistors in the distinctive stage, a process of the transistors, and a temperature of the transistors;
   receiving a transistor level IC design to be modeled;
   determining that the transistor level IC design has two stages by identifying one or more boundary nets, the one or more boundary nets being nets that are driven by a drain of one or more field-effect transistors (FETs) and drive a gate of one or more FETs, the one or more boundary nets separating the two stages, the two stages including a first stage and a second stage;
   determining that the first stage includes one or more transistors with the first VT-Type and one or more transistors with the second VT-Type;
   determining that the first VT-Type is a dominant VT-Type of the first stage because the first VT-Type corresponds to a lower threshold voltage than the second VT-Type;
   determining a base configuration of the first stage;
   mapping the first stage to the first distinctive stage based on the base configuration of the first stage and the dominant VT-Type of the first stage;
   identifying characteristics of the second stage, the characteristics including a base configuration of the second stage and a VT-type of the second stage;
   mapping the second stage to the second distinctive stage based on the characteristics of the second stage;
   determining stage boundary conditions for the first and second stages;
   determining physical conditions for the first and second stages;
   determining the cross-current effective capacitance of the first and second stages using the cross-current effective capacitance models for the first and second distinctive stages, the physical conditions for the first and second stages, and the boundary conditions for the first and second stages;
   weighting the cross-current effective capacitances for the first and second stages using logic simulation based statistics for the one or more boundary nets that separate the first and second stages, the logic simulation based statistics including a toggle count for the one or more boundary nets; and
   determining a cross-current effective capacitance for the transistor level IC design by adding the weighted cross-current effective capacitances for the first and second stages,
   wherein the transistor level IC design is provided for fabrication of integrated circuits.

* * * * *